United States Patent [19]

Capka et al.

[11] 3,907,850

[45] Sept. 23, 1975

[54] METHOD OF PRODUCING UNSATURATED ORGANOSILICON COMPOUNDS

[75] Inventors: Martin Capka; Petr Svoboda; Jiri Hetflejs; Vladimir Bazant; Petr Bazant; Vera Bazantova; Jan Bazant, all of Prague, Czechoslovakia

[73] Assignee: Ceskoslovenska akademie ved, Prague, Czechoslovakia

[22] Filed: Nov. 23, 1973

[21] Appl. No.: 418,293

[30] Foreign Application Priority Data

Nov. 23, 1973 Czechoslovakia .................. 7972-73

[52] U.S. Cl. .................... 260/448.2 E; 260/448.8 R; 252/431 P; 252/431 C; 252/437; 252/472
[51] Int. Cl.² ..... C07F 7/02; C07F 7/12; C07F 7/18
[58] Field of Search ............... 260/448.2 E, 448.8 R

[56] References Cited
UNITED STATES PATENTS

| | | | |
|---|---|---|---|
| 2,721,873 | 10/1955 | MacKenzie et al. | 260/448.2 E |
| 2,823,218 | 2/1958 | Speier et al. | 260/448.2 E |
| 2,907,784 | 10/1959 | Jex et al. | 260/448.2 E |
| 2,908,699 | 10/1959 | Jex et al. | 260/448.2 E |
| 2,970,150 | 1/1961 | Bailey | 260/448.2 E X |
| 3,658,866 | 4/1972 | Tsuji et al. | 260/448.2 E |

Primary Examiner—Paul F. Shaver

[57] ABSTRACT

Method of producing unsaturated organosilicon compounds by hydrosilylation of conjugated dienic hydrocarbons by organosilicon hydrides of the common formulae $R^2SiHCl_2$, $SiHCl_3$, $(R^3O)_3SiH$, where $R^2$ means methyl, ethyl or phenyl group, and $R^3$ is methyl, ethyl, propyl, 2-methoxyethyl and 2-ethoxyethyl-group, in the presence of catalysts consisting of compounds of zerovalent and of divalent nickel. The reactants are contacted at a temperature within the range of 70° to 200°C.

2 Claims, No Drawings

METHOD OF PRODUCING UNSATURATED ORGANOSILICON COMPOUNDS

BACKGROUND OF THE INVENTION

Processes so far known in the art for preparing monosilyl-substituted alkenes are effected only with difficulty or they produce the compounds with comparatively low yields, especially when chloro- or alkoxy-substituted silicon hydrides are used as reactants. Thus, for instance, n-butenyltrichlorsilane was obtained by reacting trichlorosilane in the presence of a radical initiator at a temperature of 300°C for 24 hours. A similar reaction catalyzed by a supported platinum catalyst and carried out at a temperature of 160°C over a period of 2.5 hours produced trichlorosilylbutene and bis(trichlorosilyl)-butane with 40% and 30% yields, respectively. A low selectivity was also found with one of the most widely used hydrosilylation catalysts, hexachloroplatinic acid. For example, the addition of methyldichlorosilane to piperylene carried out at 100° to 120°C for 5 hours produced the methyldichlorosilyl derivative in a 43% yield. On the addition of triethoxysilane to isoprene, the mono-triethoxysilyl derivative was formed with a 17% yield, and a similar reaction of trichlorosilane with chloroprene produced the monosilyl-substituted alkene with only a 7% yield. The few selective catalytic systems so far available, which were found to effect the addition of trichlorosilane to 1,3-butadiene nearly to the exclusion of the formation of the monosilylated alkene, are a metallic palladium - excess triphenylphosphine system, a zero-valent palladium complex, bis(triphenylphosphine) (maleicanhydride) palladium, and some complexes of divalent palladium. In addition to the aforesaid low selectivity of platinum catalysts, all the processes employing compounds of palladium or platinum as catalysts suffer from some disadvantages which stem from the comparatively high price of these metals. An object of the present invention is to obviate or mitigate the aforesaid disadvantages.

SUMMARY OF THE INVENTION

The nickel catalysts described in the present invention enable chlorosilyl-substituted alkenes, alkoxysilyl-substituted alkanes and alkoxysilyl-substituted alkadienes to be prepared under comparatively mild conditions, the formation of undesired side products being nearly completely avoided. Another advantage of these catalysts is their low price.

According to the invention, the reaction of organosilicon hydrides of the formulae

$$R^2SiHCl_2, \quad SiHCl_3, \quad (R^3O)_3SiH$$

where $R^2$ is methyl, ethyl or phenyl group and
$R^3$ is methyl, ethyl, propyl, 2-methoxyethyl, and 2-ethoxyethyl group, with conjugated dienic hydrocarbons, preferably butadiene, isoprene and piperylene, is carried out in the presence of catalysts consisting of compounds of zerovalent and of divalent nickel. The compounds of this type are preferably bis(cyclooctadiene)nickel, tetrakis(triphenylphosphine) nickel, tetrakis(triphenylphosphite)nickel, bis($\pi$-allyl) nickel and bis(triphenylphosphite)dicarbonylnickel. Other catalysts within the scope of this invention are dicyklopentadienyldicarbonyldinickel or substances of general formula $L_2NiX_2$, where $L_2$ are two molecules of a tertiary phosphine, advantageously triphenylphosphine, or one molecule of a ditertiary phosphine, advantageously 1,2-bis(diphenylphosphino)ethylene, 1,2-bis(diphenylphosphino)benzene, and X is an anionoid ligand, advantageously chlorine, bromine, iodine atom and cyano, nitro or thiocyanato group.

Still other catalysts are salts of divalent nickel, preferably nickel(11) chloride, bromide, iodide, nitrate, butyrate and acetylacetonate, used in the presence of a tertiary phosphine, such as triphenylphosphine, or of a ditertiary phosphine, such as triphenylphosphine, or of a ditertiary phosphine, such as 1,2-bis(diphenylphosphino) ethane or 1,2-bis(diphenylphosphino)benzene.

Catalytic activity of Ni(11) salts may usually be advantageously modified by the addition of a tertiary amine, preferably triethyl-, tripropyl- or tributylamine, or of a N-heterocyclic base, preferably pyridine. The addition of these substances turned out to be particularly advantageous in the case of nickel(11)acetylacetonate and nickel(11) butyrate.

The molar ratio of the nickel compound to the free ligand, which is advantageously the aforesaid tertiary, and ditertiary phosphine, tertiary amine or N-heterocyclic compound, is generally controlled by the coordination ability of these ligands, and for the purposes of this invention the most advantageous molar ratio of these components lies within 1:10 and 10:1.

It was found that the reaction may be also effected in the presence of catalysts formed from bis(cyclooctadiene) nickel, tetrakis(triphenylphosphine)nickel, tetracarbonylnickel, tetrakis(triphenylphosphite)nickel, bis($\pi$-allyl) nickel, bis(triphenylphosphine)dicarbonylnickel, compounds of the general formula $L_2NiX_2$, where L and X have the same meaning as above, salts of divalent nickel, advantageously nickel chloride, bromide, iodide, nitrate, butyrate and acetylacetonate, and organic polymers containing tertiary amine, tertiary phosphine or nitrile groups, the polymeric compounds being preferentially polystyrene, divinylbenezenestyrene copolymers, allyl chloride-divinylbenzene copolymers, polyvinyl chloride, polymethacrylates and their copolymers, the metal content in the catalysts being 0.1 up to 20% by weight. Catalysts not containing tertiary phosphine or tertiary amine groups are advantageously used in the presence of a tertiary or ditertiary phosphine, preferably triphenylphosphine, 1,2-bis(triphenylphosphino) ethane, or in the presence of a tertiary amine, preferably triethyl-, tripropyl-, and tributylamine, or of a N-heterocyclic compound, preferably pyridine.

Another group of the catalysts within the scope of this invention comprises the substances formed from bis(cyclo-octadiene)nickel, tetrakis(triphenylphosphine) nickel, tetracarbonylnickel, tetrakis (triphenylphosphite)nickel, bis($\pi$-allyl)nickel, bis(triphenylphosphine)dicarbonylnickel, compounds of the formula $L_2NiX_2$, where L and X have the meaning above specified, salts of divalent nickel, preferably nickel(11) chloride, bromide, iodide, nitrate, butyrate and acetylacetonate, and inorganic materials, such as silica, alumina, glass and molecular sieve, containing tertiary phosphine, tertiary amine and cyano groups, these groups being bonded to the inorganic surface either directly or through —O—Si—$R^1$ chain, where $R^1$ is $C_2$–$C_{10}$ alkylene group, arylene group, preferably phenylene, naphthylene or biphenylene, $C_7$–$C_{15}$ aralkylene group, $C_7$–$C_{15}$ alkarylene group, the catalysts containing from 0.01 to 10% by weight of the metal. With these catalysts hydrosilylation reactions are carried out in the presence of a tertiary or ditertiary phosphine, advantageously triphenylphosphine, 1,2-bis(diphenylphosphine)ethane, or in the presence of a tertiary amine, advantageously triethyl-,tripropyl- and tributylamine, or of a N-heterocyclic compound, advantageously pyridine.

The reaction catalyzed by the aforesaid types of the catalysts can also be effected in the presence of a solvent, under the pressure of the vapors of the reaction components or at an elevated pressure adjusted by an inert gas, such as nitrogen or argon. The catalysts having the transition metal coordinately bound to polymeric organic compounds or to inorganic supports enable the reaction to be carried out with reactants in a gaseous phase. As a solvent, any substance which does not react with the reactants and dissolves the reacting compounds, and in the case of soluble catalysts, dissolves them at least partly, may be used. Such solvents are, for example, ethers, such as tetrahydrofurane, or aromatic hydrocarbons, such as benzene, toluene, a xylene etc. The choice of the reaction temperature is influenced above all by the reactivity of the starting compounds and by the nature of the catalyst. The reaction may be carried out at a temperature from 70° to 200°C, advantageously at temperature within the range from 100° – 140°C.

Although the relative amounts of the silicon hydride and the dienic hydrocarbon are determined by the stoicheiometry of the reaction, the reaction may also be carried out with non-stoicheiometric ratios of the reaction components. Thus, for example, with chloro-substituted silanes, a moderate excess of the dienic hydrocarbon somewhat increases the conversion of the reaction with respect to the silicon hydride. On the other hand, in the case of alkoxy-substituted silanes, an excess of the dienic hydrocarbon increases the yield of octadienylsilanes. A great excess of the diene was found to bring about an undesired side reaction in some cases, the formation of butadiene oligomers at the expense of the products of the hydrosilylation reaction.

The amount of the catalyst may vary within wide limits. The catalysts described in this invention are effective in an amount of about 1 mol nickel per $1 \times 10^3$ to $1 \times 10^4$ mol dienic hydrocarbon; the maximum of the catalyst is dictated by the economics of the process. It has been found that desirable rates of the reaction may be obtained by the use of the catalyst in concentrations of the order of 1 mol nickel per $1 \times 10^2$ to $1 \times 10^4$ mol dienic hydrocarbon. To effect the reaction, it is generally advantageous to prepare the reaction mixture such that the catalyst is first placed in the reaction vessel, then the dienic hydrocarbon is introduced, and finally the silicon hydride is added.

The alkenyl- or alkadienylsilanes obtained by the process described in this invention contain reactive chlorine atom or reactive alkoxy group, along with multiple bonds. They may then serve as starting compounds for preparing other silicon derivatives. They may be also used, for example, for hydrofobisation of inorganic materials or as coupling agents for cross-linking of inorganic materials with organic polymers.

The following examples are illustrative of the practice of the invention and are not intended for purposes of limitation. Unless otherwise stated, all parts are by weight.

EXAMPLE 1

A reaction vessel was charged with 12 parts of macroreticular styrene-divinylbenzene copolymer containing —$CH_2P(C_6H_5)_2$ groups (P content 5.1%), and then 12 parts of nickel(11) chloride (hexahydrate) dissolved in 100 parts of ethanol were added. The reaction mixture was allowed to stand for 2 days and then it was heated at 85°C for 16 hours. Filtration, washing the product with ethanol and drying it yielded a catalyst containing 0.9% Ni.

EXAMPLE 2

A reaction vessel was charged with 31 parts of macroreticular styrene-divinylbenzene copolymer containing —$CH_2P(C_6H_5)_2$ groups (P content 3.7%), and then 12 parts of nickel (11) nitrate (hexahydrate), dissolved in 250 parts of ethanol, were added and the reaction mixture was kept under mild reflux for 5 hours. Filtration, washing the product with ethanol and drying it yielded a catalyst containing 0.3% Ni.

EXAMPLE 3

A reaction vessel was charged with commercial styrenedivinylbenzene copolymer containing dimethylamino groups, and then 10 parts of nickel (11) chloride (in the form of its hexahydrate), dissolved in 700 parts of ethanol, were added and the reaction mixture was maintained under mild reflux for 3 hours. Filtration, washing the product with ethanol, and drying it gave a catalyst containing 3.8% Ni.

EXAMPLE 4

Two parts of bis(triphenylphosphine) nickel(11) dichloride dissolved in 200 parts of benzene were added to 15 parts of silica containing cyano groups bonded to inorganic support through —O—Si—$(CH_2)_3$ - chain. The reaction components were allowed to stand at 30°C for 30 hours. The solid was filtered off, washed with benzene and dried to give a catalyst containing 0.78% Ni.

EXAMPLE 5

Two parts of hexahydrate of nickel(11) dichloride dissolved in 300 ml of ethanol were added to 15 parts of the support described in Example 4, and the mixture was heated to its boiling point for 3 hours. Filtration of the solid material, its washing with ethanol, and drying afforded a catalyst containing 0.88% Ni.

EXAMPLE 6

A reaction vessel was charged with an appropriate amount of the catalyst, butadiene and trichlorosilane and the reaction mixture was heated at 120°C for 3 hours. The amounts of reaction components are listed in the following Table 1, along with the yields of butenyltrichlorosilane determined by g.l.c. and calculated with respect to trichlorosilane.

TABLE 1

| Catalyst (wt.parts) | Ligand[*] (wt.parts) | butadiene (parts) | trichlorosilane (parts) | Yield of butenyltrichlorosilane % |
|---|---|---|---|---|
| Ni(acac)$_2$ (10) | — | 650 | 1400 | 17 |

TABLE 1-continued

| Catalyst (wt.parts) | | Ligand[r] (wt.parts) | butadiene (parts) | trichlorosilane (parts) | Yield of butenyltrichlorosilane % |
|---|---|---|---|---|---|
| Ni(CO)$_2$(PPh$_3$)$_2$ (10) | | — | 650 | 1400 | 57 |
| | | | 650 | 1400 | 53 |
| Catalyst from Example 1 (10) | | | | | |
| NiCl$_2$(PPh$_3$)$_2$ | (10) | — | 650 | 1400 | 64 |
| NiCl$_2$·6H$_2$O | (5) | PPh$_3$ (20) | 3250 | 7000 | 4 |
| Ni(NO$_3$)$_2$·6H$_2$O | (5) | PPh$_3$ (20) | 3250 | 7000 | 53 |
| Ni(PPh$_3$)$_4$ | (5) | — | 650 | 1400 | 91 |
| NiCl$_2$(PPh$_3$)$_2$ | (10)[rr] | | 1300 | 2800 | 69 |
| Catalyst from Example 3 (10) | | — | 650 | 1400 | 28 |
| Ni(NO$_3$)$_2$·6H$_2$O | (6) | diphos (23) | 1950 | 4200 | 12 |
| Ni(NO$_3$)$_2$·6H$_2$O | (6) | PBu$_3$ (25) | 1950 | 4200 | 61 |
| Catalyst from Example 2 (10) | | PPh$_3$ (27) | 1950 | 3500 | 28 |
| NiBr$_2$(PPh$_3$)$_2$ | (8) | — | 1950 | 3500 | 67 |
| Ni(C$_3$H$_5$O$_3$)$_2$ | (5) | PPh$_3$ (20) | 1300 | 2800 | 31 |
| Ni(acac)$_2$ | (5) | BDFB (25) | 1300 | 2800 | 44 |
| NiCl$_2$·6H$_2$O | (5) | diphos (25) | 1950 | 4200 | 71 |
| NiI$_2$(PPh$_3$)$_2$ | (7) | — | 1300 | 2800 | 54 |
| Ni(CN)$_2$(PPh$_3$)$_2$ | (7) | — | 975 | 2100 | 47 |
| Catalyst from Example 5 (50) | | PPh$_3$ (20) | 650 | 1400 | 59 |
| Catalyst from Example 6 (50) | | PPh$_3$ (20) | 650 | 1400 | 62 |
| NiCl$_2$(PPh$_3$)$_2$ (10) | | NEt$_3$ (8) | 1300 | 2100 | 47 |
| Ni(acac)$_2$ (5) | | NEt$_3$ (12) | 1300 | 2100 | 68 |

[r] acac = acetylacetonate, Ph = phenyl, Bu = butyl, diphos = 1,2-bis-diphenylphosphino)ethane C$_3$H$_5$O$_3$ = CH$_3$CH(OH)COO$^-$, BDFB = 1,2-bis(diphenylphosphino)benzene;
[rr] benzene, 3200 parts

EXAMPLE 7

A reaction vessel was charged with 12 parts of tetrakis (triphenylphosphine)nickel and then 680 parts of isoprene, 1500 parts of tetrahydrofurane, and 1400 parts of trichlorosilane were successively added. The reaction mixture was then heated at 120°C for 3 hours. After cooling the mixture to room temperature, it contained 86% of 1/1 adduct of trichlorosilane with isoprene.

EXAMPLE 8

Example 7 was repeated with the exception that piperylene was used in place of isoprene. The reaction mixture contained 69% of 1/1 adduct of trichlorosilane with piperylene.

EXAMPLE 9

A reaction vessel was charged with 10 parts of bis(triphenylphosphine)nickel(11) dichloride, and then 1,300 parts of butadiene and 2,000 parts of methyldichlorosilane were introduced. The reaction mixture was then heated at 120°C for 3 hours, and after cooling to room temperature it contained 65% of methylbutenyldichlorosilane.

EXAMPLE 10

Example 9 was repeated with the exception that ethyldichlorosilane was used in place of methyldichlorosilane. The reaction mixture contained 54% of ethylbutenyldichlorosilane.

EXAMPLE 11

Appropriate amounts of the catalyst, butadiene and triethoxysilane were introduced to a reaction vessel and the reaction mixture was heated at 120°C for 3 hours. The amounts of reaction components, along with the yields of butenyltriethoxysilane, are summarized in Table 2.

TABLE 2

| Catalyst[r] (parts) | | Ligand[r] (parts) | butadiene (parts) | triethoxysilane (parts) | butenyl-triethoxysilane % | oktadienyl-triethoxysilane % |
|---|---|---|---|---|---|---|
| NiCl$_2$(PPh$_3$)$_2$ | (5) | — | 1950 | 1750 | 46 | 17 |
| NiBr$_2$(PPh$_3$)$_2$ | (5) | — | 1950 | 1750 | 52 | 18 |
| Ni(PPh$_3$)$_4$ | (5) | — | 1950 | 4340 | 67 | 9 |
| Ni(C$_3$H$_5$O$_3$)$_2$ | (5) | PPh$_3$ (20) | 1950 | 1750 | 28 | 2 |
| Catalyst from example 5 | | PPh$_3$ (20) | 650 | 870 | 79 | 4 |
| Ni(C$_3$H$_5$O$_3$)$_2$ | (6) | PBu$_3$ (20) | 1950 | 1740 | 68 | 3 |
| NiCl$_2$(PPh$_3$)$_2$ | (10) | Et$_3$N (9) | 1300 | 1260 | 62 | 11 |
| NiCl$_2$(PPh$_3$)$_2$ | (10) | pyridine (10) | 1300 | 1260 | 54 | 14 |
| Ni(C$_3$H$_5$O$_3$)$_2$ | (5) | pyridine (10) | 1300 | 1260 | 68 | 4 |
| NiCl$_2$ | (5) | Et$_3$N (13) | 1300 | 1260 | 28 | 8 |
| Ni(C$_3$H$_5$O$_3$)$_2$ | (6)[rr] | pyridine (23) | 1300 | 1260 | 52 | 13 |

[r] Et = ethyl, Bu = butyl, Ph = phenyl, C$_3$H$_5$O$_3$ = Ch$_3$CH(OH)COO$^-$
[rr] temperature 90°C

EXAMPLE 12

A reaction vessel was successively charged with 12 parts of tetrakis(triphenylphosphine)nickel, 130 parts of butadiene and 190 parts of tris(2-methoxyethoxy)silane, and the mixture was heated at 120°C for 3 hours; after cooling the mixture to room temperature, the mixture contained 64% of tris(-2-methoxyethoxy)-butenylsilane.

EXAMPLE 13

Example 12 was repeated with the exception that tris(2-ethoxyethoxy)silane was used in place of tris(2- methoxyethoxy)silane. Butenyltris(2-ethoxyethoxy)silane was obtained with a 46% yield.

EXAMPLE 14

Example 12 was repeated with the exception that tri(n-propyl)silane was used in place of tris(2-methoxyethoxy) silane. The product of the reaction was butenyltri(n-propyl) silane (42% yield).

EXAMPLE 15

Example 12 was repeated with the exception that 120 parts of trimethoxysilane were used in place of 190 parts of tris(2-methoxyethoxy)silane. After the reaction, the reaction mixture contained 38% of butenyltrimethoxysilane, along with 40% of octadienyltrimethoxysilane.

EXAMPLE 16

A reaction vessel was charged with 1 part of bis-(triphenylphosphine)nickel(11) dichloride, 195 parts of butadiene, and 350 parts of trichlorosilane, and the reaction mixture was heated at the temperature indicated below for 3 hours. The following yields of butenyltrichlorosilane, depending on the reaction temperature used, were obtained:

|    | Temperature | Yield |
|----|-------------|-------|
| at | 150°C       | 83%,  |
| at | 180°C       | 78%,  |
| at | 200°C       | 53%   |

EXAMPLE 17

A reaction vessel was charged with 2.4 parts of bis (cyclopentadienyl)-dicarbonyldinickel, 820 parts of triethoxysilane and 270 parts of butadiene. The reaction mixture was heated at 80°C for 2 hours; after cooling the mixture to room temperature, distillation of the mixture yielded 80% butenyltriethoxysilane.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. A process for the production of unsaturated organosilicon compounds comprising reacting together in the presence of a nickel compound a silicon compound and a dienic hydrocarbon, said nickel compound being bis (1,5 cyclooctadiene) nickel, tetracarbonylnickel, bis (triphenylphosphine) dicarbonylnickel, and tetrakis (triphenylphosphine) nickel, a nickel complex of the formula $L_2 NiX_2$, where $L_2$ is chosen from the group consisting of two molecules of triphenylphosphine and one molecule of 1,2-bis (diphenylphosphine)ethane, and X is chosen from the group consisting of chlorine, bromine and iodine atom, a cyano group, and a nickel salt selected from the group consisting of a nickel chloride, nickel bromide, nickel iodide, nickel nitrate, nickel lactate and nickel acetylacetonate, coordinately bound to a tertiary phosphine selected from the group consisting of triphenylphosphine, tributylphosphine, 1,2-bis (diphenylphosphino) ethane, 1,2 -bis (diphenylphosphino) benzene and a tertiary amine selected from the group consisting of triethylamine, tripropylamine, and tributylamine, said silicon compound being selected from the group consisting of dichloromethylsilane, dichloroethylsilane, dichlorophenylsilane, trichlorosilane, triethoxysilane, tripropoxysilane, tris (2-methoxyethoxysilane), and tris (2-ethoxyethoxy) silane, and said dienic hydrocarbon being selected from the group consisting of 1,3-butadiene, isoprene, and piperylene.

2. A process as in claim 1, in which the reaction is effected by heating the reaction mixture at a temperature within the range of 70° to 170°C.

* * * * *